INVENTORS
William C. Johnston &
William A. Tiller.
BY
ATTORNEY

United States Patent Office 3,401,021
Patented Sept. 10, 1968

3,401,021
APPARATUS OF ZONE REFINING AND CONTROLLING SOLUTE SEGREGATION IN SOLIDIFYING MELTS BY ELECTROMAGNETIC MEANS
William A. Tiller, Menlo Park, Calif., and William C. Johnston, Pittsburgh, Pa., assignors to Westinghouse Electric Corporation, Pittsburgh, Pa., a corporation of Pennsylvania
Original application Aug. 1, 1961, Ser. No. 128,446, now Patent No. 3,203,768. Divided and this application Aug. 26, 1965, Ser. No. 482,733
5 Claims. (Cl. 23—273)

ABSTRACT OF THE DISCLOSURE

Apparatus for controlled solification of molten materials which comprises a series of coils, usually a plurality of single turn coils, disposed adjacent the solid-liquid interface of the body of molten material being solidified, the coils being sequentially energized by alternating current to cause movement of the melt at such interface by a magnetic field varying in force and direction.

---

This application is a division of our application Ser. No. 128,446, filed Aug. 1, 1961, and assigned to the present assignee, issued as Patent 3,203,768.

The present invention relates to apparatus for improved zone refining and for controlling solute segregation in the solidification of a fusible material by electromagnetic mixing and, in particular, to apparatus for electromagnetically stirring molten material as it freezes.

It is well known in the prior art to zone refine metals, semiconductors and the like, by disposing a long bar of metal, for example, within an elongated receptacle of a refractory material and passing the receptacle with the metal slowly through a heating means such as an induction coil which melts only a small zone of the metal bar. As the receptacle moves, the molten zone traverses the bar of metal and carries impurities with it. In practice, a bar of the metal is moved through a refining apparatus comprising a series of induction coils whereby progressive molten zones are formed and traverse the bar of metal in a single pass through the apparatus. For impurities whose solubility in the molten phase exceeds that in the solid phase, the impurities are concentrated in the molten zone and are progressively swept toward the end of the bar of metal. After the bar has been cooled, the end containing the impurities may be cut off and the remainder is highly purified metal. The process may also be employed for growing a single crystal by seeding the initial molten zone with a single crystal.

It is also well known in the prior art that during crystal growth from a melt comprising a major component with a minor solute component dissolved therein, the solute concentration in the liquid immediately ahead of the solid-liquid interface changes due to the partitioning of solute between the two phases. This solute distribution limits the speed at which homogeneous and relatively perfect crystals, single or poly-crystals, can be grown. Control of this solute distribution provides a measure of control over the state of aggregation of a solid material prepared by the freezing process applied to a melt.

In purifying a material by zone refining, the efficiency of the process as to impurity refinement may be increased and the solute distribution may be controlled by suitable stirring of the molten zone and minimizing the thickness of the diffusion boundary layer at the crystal-melt interface. Also, to grow a crystal of contant composition or to attain a particular solute distribution requires exact and constant control of the diffusion boundary layer during the freezing process. Natural convection in the liquid melt cannot be relied upon for control of the diffusion boundary layer; therefore, a forced motion must be introduced into the liquid to gain the required degree of control.

It is known to apply a constant magnetic field adjacent one end of a molten zone in a plane parallel to the solid-liquid interface. This technique is deficient in the following respects: (1) the induced fluid flow can be only in planes parallel to the interface since the direction of current flow is axial in the bar; and (2) the charge must comprise an electrically conductive material. The latter limitation prevents the purification of non-conductive materials by this prior art stirring technique.

The object of the present invention is to provide an apparatus for removing soluble and/or insoluble impurities and control solute segregation from a fusible solid having a molten zone by subjecting it to either zone melting or normal freezing, the apparatus comprising a movable and variable magnetic field means disposed adjacent the molten zone.

Another object of the invention is to provide apparatus for controlling solute segregation in a fusible material by electromagnetic stirring comprising means for passing an alternating current to electromagnetic coils disposed about a molten portion of a body of the material in contact with a solidified portion of the material so that a force or force couple is applied to said molten portion to effect any one of the following liquid movements: (1) rotating the liquid in the planes perpendicular to the body axis, (2) rotating the liquid in planes parallel to the body axis, (3) translating the liquid in planes parallel to the body axis, or (4) translating the liquid radially in planes perpendicular to the body axis, or combinations of two or more, whereby a relatively high degree of control is exercised over the configuration and magnitude of melt flow, the thickness of the diffusion boundary layer at the freezing interface and the amount of solute entering the solid from the melt.

A futrher object of the invention is to provide means for producing either certain uniform or non-uniform distributions of solute elements in a fusible solid by creating either a molten zone in the body or by melting the total charge and performing a normal freeze operation, wherein the volume of molten material is subjected to a torque by creating a moving magnetic field within it by applying current directly to coils of electromagnets disposed about the molten portion thereby controlling the thickness of the diffusion boundary layer at the freezing interface.

Other objects of the invention will, in part, be obvious and will, in part, appear hereinafter.

In order to more fully understand the teachings of the invention, reference should be had to the following detailed description and drawings, of which:

Figure 1:
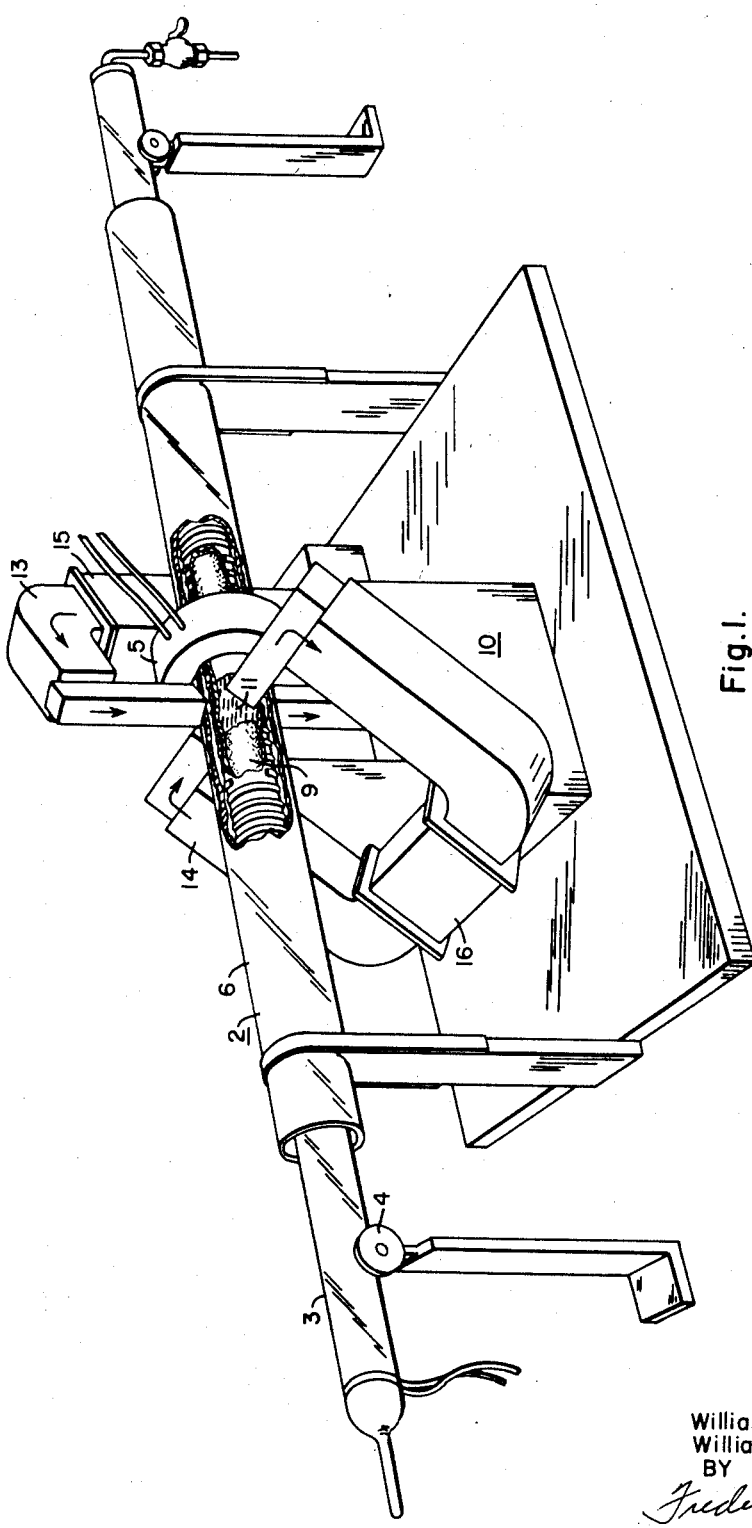
FIGURE 1 is a perspective view of an electromagnetic device designed to rotate the liquid in planes perpendicular to the specimen axis.

In accordance with the present invention and in attainment of the foregoing objects, there is provided an apparatus, which may take various forms, for either removing soluble or insoluble impurities from a fusible solid or to produce a desired certain uniform or non-uniform distribution of the constituents or impurities in at least a portion of the solidified body of the material or to evenly distribute an added constituent throughout the body.

Broadly, the apparatus comprises magnetic means capable of being energized with alternating current from a suitable source of polyphase alternating current in a predetermined sequence so that the application of the variable magnetic field, the magnetic means being so associated and shaped as to fit closely to at least a portion of a body of molten material so that a high proportion of the magnetic field penetrates into the molten material and causes it to be stirred in varying directions and with varying force, particularly at the solid-liquid interface.

For the removal of impurities, a molten portion is created in a part or in all of the body of material by means of a heating coil or other source of heat. Freezing is caused to progress into the molten portion, there being at least some solid-liquid interface having a diffusion boundary layer adjacent to it. The volume of molten material is subjected to a force or force-couple by the penetration of the moving magnetic field into the volume by the applied alternating current cooperating with the coils of the electromagnets disposed about the molten portion. The molten material, which may be either a metal, a semiconductor, or even a non-conductor, may thereby be stirred with a variety of fluid flow configurations such as rotation in a plane perpendicular to the solid-liquid interface, or in the plane of the solid-liquid interface or translation radially or longitudinally in the molten portion depending on the arrangement and form of the electromagnets.

Convection in the molten liquid reduces the thickness of the diffusion layer at the freezing solid-liquid interface and improves the effective partition coefficient. Convection also lessens the possibility of constitutional supercooling and dendrite formation. Therefore, the moving magnetic thickness of the diffusion boundary layer and controls the concentration and distribution of the minor constituents or impurities entering the sold phase. During stirring, the molten materal is progressively frozen to a solid thereby causing the newly frozen solid phase to be substantially altered in impurity concentration (reduced for partition coefficients less than unity and increased for partition coefficients greater than unity). These magnetic means also may be employed to produce a specified distribution of a particular constituent or impurity in the body.

The electromagnetic stirring devices may also be employed in growing single crystals or polycrystalline materials by maintaining the entire charge in the molten state, applying the magnetic stirring system and progressively pulling a solid crystal from the melt while stirring.

Both the degree of purification during zone refining and the particular solute distribution frozen into a crystal during crystal growth, depend upon the effective partition coefficients, $k$, of the solute under consideration. The effective partition coeffifficient, $k$, depends upon the normalized freezing velocity, $v\delta_c/D$, where $v$ is the freezing velocity, $\delta_c$ is the diffusion boundary layer thickness and $D$ is the solute diffusion coeffifficient in the liquid. The minimum tme required to produce a certain degree of purification during zone refining occurs when $v\delta_c/D$ approximately equals 1. Thus by reducing $\delta_c$ by electromagnetic stirring, the freezing velocity, $v$, can be increased maintaining $v\delta_c/D$ equal to 1 and the cost of producing this purified material decreases as $v$ increases. For producing a certain solute distribution one must maintain $v\delta_c/D$=constant and and again the time and cost of this operation can be reduced as $v$ is increased by reducing $\delta_c$ through electromagnetic mixing while maintaining $v\delta_c/D$=constant. One can thus see the advantages produced by controlling the diffusion boundary layer thickness, $\delta_c$. The diffusion boundary layer thickness, $\delta_c$, is altered by fluid moving in a loop consisting of components parallel and perpendicular to the solid-liquid interface. This particular fluid flow configuration may be considered as either primary circulation or secondary circulation depending upon whether this fluid flow is produced directly by applied forces or as a by-product of a different primary flow. For example, when a magnetic field rotates in planes parallel to the solid-liquid interface it produces a fluid rotation in these planes as a primary circulation; however, the diffusion boundary layer thickness, $\delta_c$, is altered not by this primary circulation but by a secondary circulation pattern. The electromagnetic devices of this invention therefore are important as a consequence of either their primary or secondary circulation patterns.

The velocity, $u$, of the fluid flow determines how much $\delta_c$ is altered. The velocity, $u$, depends upon the liquid viscosity, $\nu$ and the applied force or force-couple, F. Control of $\delta_c$, therefore, may be produced by variation of F. The force or force-couple in the outer surface of the liquid due to an electromagnetic field increases linearly with (1) the liquid conductivity, $\sigma$, (2) the square of the magnetic field strength, $H^2$, and (3) the frequency of the applied magnetic field, $f$. Thus, for a given material F may be increased and thus $\delta_c$ decreased by increasing either $f$ or H.

The applied force, F, decreases with distance into the liquid and falls to $1/\epsilon$, where $\epsilon$ is the base for natural logarithms, of its surface value in a "skin depth" of thickness, L, where L is inversely proportional to $\sigma f^{1/2}$. Thus, for a given material, if $f$ is very large, the applied force is concentrated in the surface layers of the liquid whereas when $f$ is small the force may be applied throughout the total volume of liquid. Further, if it is necessary to penetrate a conducting crucible to stir the liquid, a high value of $f$ is prohibitive.

In any particular stirring application the configuration of both the liquid and the solid-liquid interface determine the best electromagnetic field configuration. The dimensions of the melt and the presence or absence of a conducting crucible will determine the best field frequency to use. The conductivity, viscosity and diffusion boundary layer thickness desired will determine the best magnetic field strength to use. For non-conducting liquids, the introduction of conducting rotors will allow the liquid to be stirred by the action of the electromagnetic field.

Referring to FIGURE 1, an electromagnetic device 10 is applied to the stirring of the liquid zone 11 in a zone refining apparatus 2. The apparatus 2 comprises a sealed tube 3 mounted on rollers 4 for reciprocation inside of a heating coil 5 which surrounds a hollow insulating tube 6 of a refractory such as silica or alumina. A boat of graphite or the like carries an elongated specimen 9 which is heated by the coil 5 to produce a narrow molten zone 11. A magnetic field is applied to the molten zone 11 in the region of the freezing interface by crossed magnetic yokes 13 and 14 of a ferromagnetic material such as nickel iron, one of which produces a magnetic field at molten zone 11 in planes perpendicular to the axis of the elongated specimen 9 and the other produces a magnetic field in planes orthogonal to both the specimen axis and the other magnetic field. A rotating magnetic field is induced by passing two-phase current to the field coils 15 and 16 of the yokes 13 and 14 from a suitable source such as an alternating current generator (not shown). This field configuration rotates the liquid in planes perpendicular to the specimen axis and the control $\delta_c$ by secondary circulation if the freezing interface is perpendicular to the specimen axis and primary circulation if the freezing interface is parallel to the specimen axis.

The coils 15 and 16 require fairly high voltages to produce an effective stirring current, because of the resistance of the yokes 13 and 14. For instance with a two inch pole face separation, to produce a field of 300 gauss in the molten zone requires a voltage of from 400 to 600 volts across the coils and capacitors are required in the circuits to balance the reactive current. The line voltage is of the order of 50 to 100 volts.

The arrangement of FIGURE 1 can be modified to dispose three sets of magnetic yokes and coils supplied with three phase current so as to produce a rotating magnetic field in the plane perpendicular to the specimen axis.

Figure 2:
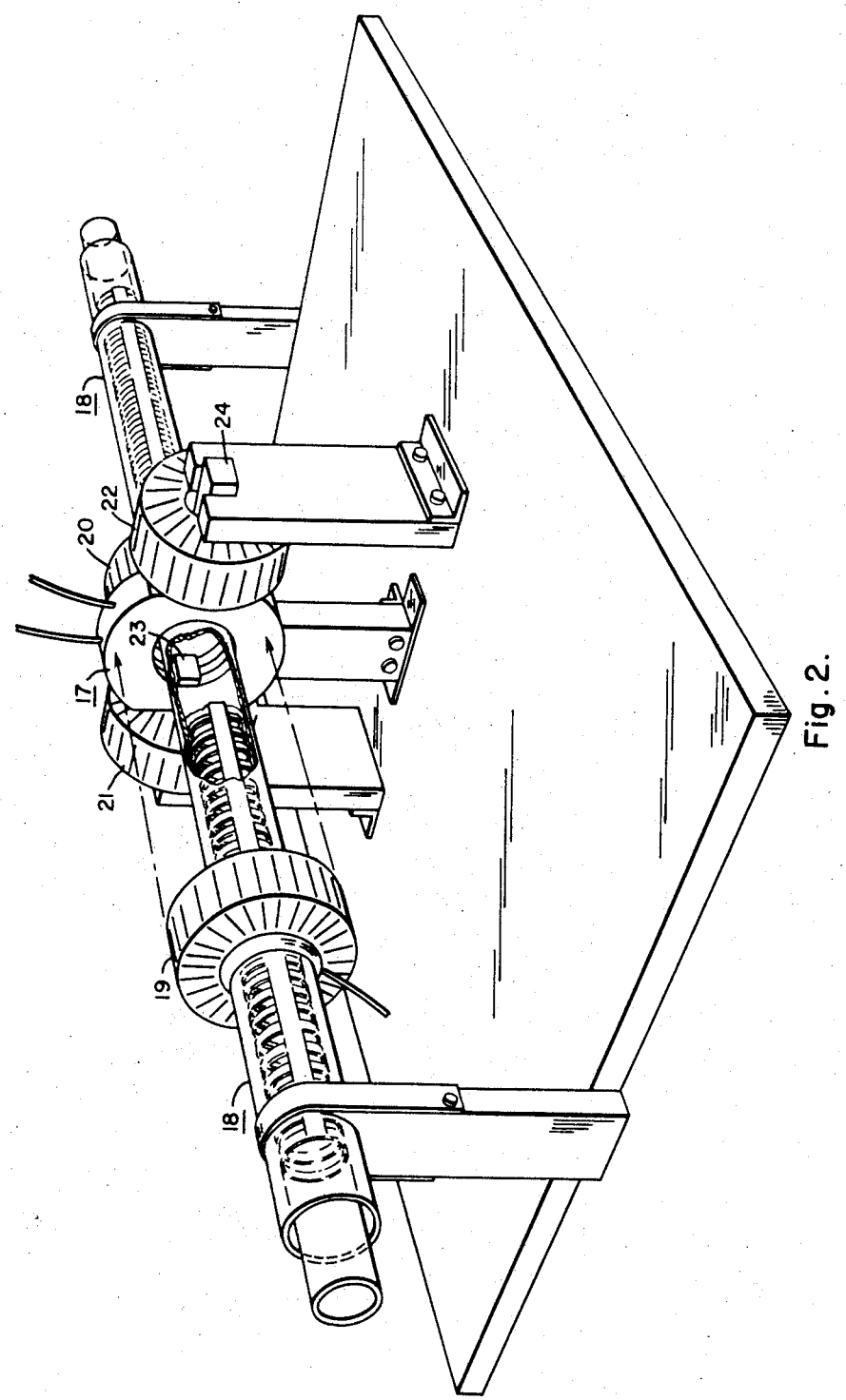
FIGURE 2 is a perspective view of an electromagnetic device designed to rotate the liquid in planes parallel to the specimen axis.

An electrically more efficient and lower voltage arrangement for stirring is illustrated in FIGURE 2.

Referring to FIGURE 2, a heating coil 17 is adapted to produce a molten zone in a zone melting apparatus 18. A rotating magnetic field is applied to the liquid melt zone in the region of the freezing interface by applying two-phase alternating current to field coils 19 and 20, which do not contain any ferromagnetic core materials associated therewith. In FIG. 2, coil 19 is shown out of position, and in operation would be moved into contact with heating coil 17. Coils 19 and 20 produce a magnetic field in planes parallel to the specimen axis. Field coils 21 and 22 which are disposed to produce a magnetic field in planes perpendicular to the specimen axis have small focusing pole pieces 23 and 24 whereby this latter field is applied to the melt more efficiently. The magnetic field configuration from the joint operation of coils 19, 20, 21 and 22 rotates the liquid melt in planes parallel to the specimen axis and controls $\delta_c$ by primary circulation when the freezing interface is perpendicular to the specimen axis and, in part, by secondary circulation when the freezing interface is parallel to the specimen axis.

Good results have been obtained with the apparatus of FIGURE 2 applied to apparatus similar to that of FIGURE 1, with a line voltage of 10 volts being adequate to produce the same degree of stirring as with the FIG. 1 arrangement. Consequently, the FIG. 2 apparatus is far more efficient, and needs less critical electrical insulation and capacitors than does the FIG. 1 apparatus.

Figure 3A:
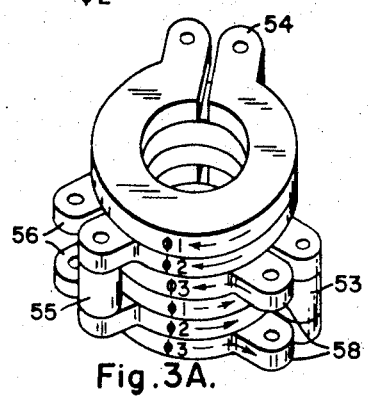
FIGURE 3A is a perspective view of the electromagnetic coils.
Figure 3:
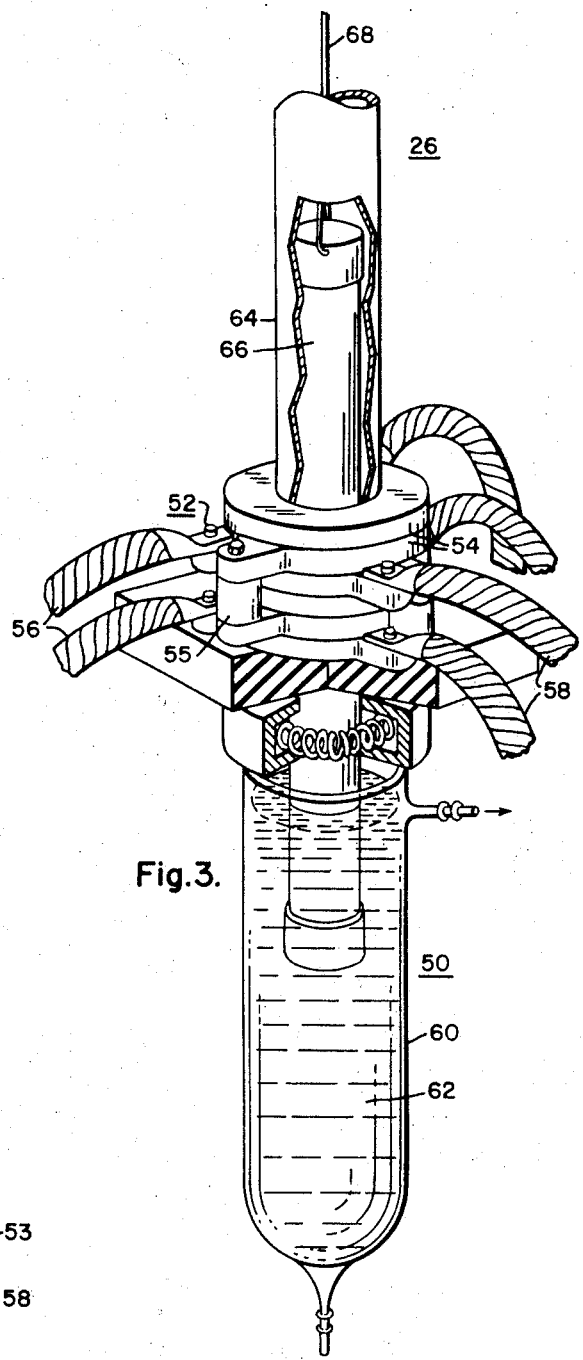
FIGURE 3 is a perspective view of an electromagnetic device designed to translate the liquid in planes parallel to the specimen axis.

Referring to FIG. 3, an electromagnetic device 52 comprising three stacked circular field coils 54, 56 and 58 and their respective leads from a three-phase current source is applied to elongated bar solidification apparatus 50 suitable for growing long crystals or ingots. The apparatus 50 comprises a quenching tube 60 containing a quenching fluid 62, either a gas or a liquid, at the lower end of a heating tube 64 in which an elongated graphite cylinder 66 containing a metal or semiconductor or the like, is heated to a temperature to melt the contents of the cylinder 66. A suitable means such as a wire 68 connected to a driving means (not shown) lowers the graphite cylinder at a given speed into the quenching fluid 62 so that the melt solidifies at a predetermined rate from the botton end. The electromagnetic device is located at the solid-liquid interface area in the cylinder 66.

FIGURE 3A shows the details of single twin loop field coils 54, 56 and 58, FIG. 3, their connectors 53 and 55 (as well as one not shown) and indicates the direction of current flow in the coils.

The magnetic field is applied to the liquid melt in the region of the freezing interface by applying a three-phase current to loop field coils 54, 56 and 58 which produces a longitudinally translating magnetic field parallel to the specimen axis. This field configuration rotates the liquid primarily in planes parallel to the specimen axis and controls $\delta_c$ by primary circulation when the freezing interface is either perpendicular to or parallel to the specimen axis.

Figure 4A:
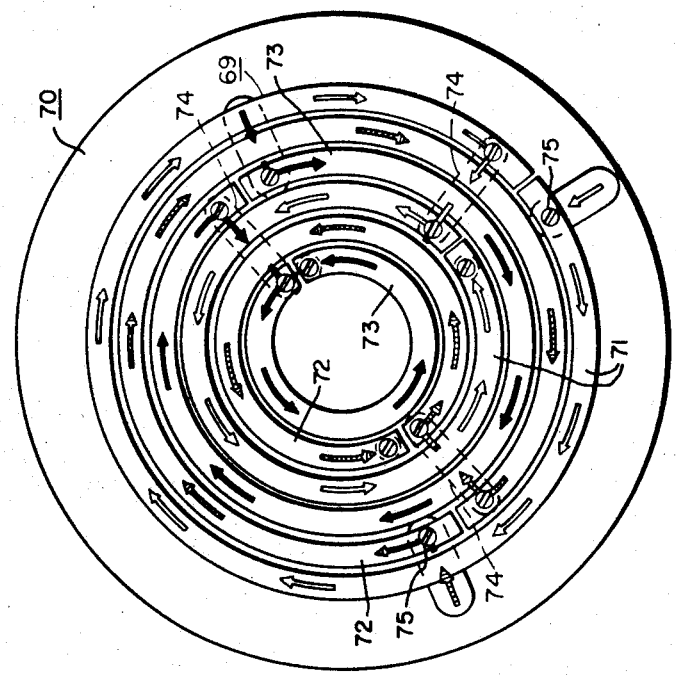
FIGURE 4A is a plan view of the electromagnetic coils of FIGURE 4.
Figure 4:
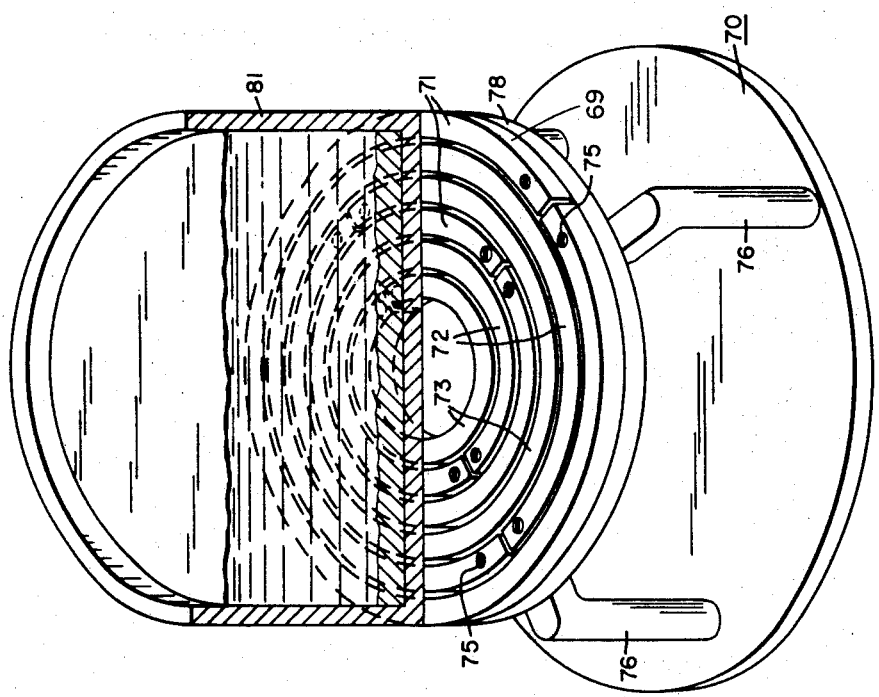
FIGURE 4 is a perspective view of an electromagnetic device designed to translate the liquid radially in planes perpendicular to the specimen axis.

Referring to FIGURES 4 and 4A, a pancake electromagnetic device 70 is illustrated. A moving magnetic field is produced by applying a three-phase alternating current to a pancake coil 69 comprising a series of three field coils 71, 72 and 73, each of which comprises two separated single turns as shown, which produce a radially translating magnetic field. The field coils are electrically connected to an electrically conductive metal base member 74 by means of inverted L-shaped supports 76 and mounting screws 75 and metal straps 79 and are electrically insulated from the supports by means of an insulating plate 78. Alternating current from a three-phase source is applied to each of supports 76 which conduct the current to coils 71, 72 and 73.

If a cylindrical melt 81 is placed on the upper surface of the pancake coil 69 so that it is perpendicular to the axis of the melt, the primary flow of melt will be in planes perpendicular to the melt axis. Further, if one or more of such pancake coils 69 are placed adjacent to and parallel to the cylindrical wall of a crucible containing a melt or a metal weld puddle, the primary flow of liquid is in planes parallel to the specimen axis. In either case, this coil structure produces a strong secondary flow along the axis of the pancake coil.

While the coils are arranged in three sets for three-phase current operation, it should be understood that any number of phases may be obtained by increasing the sets of concentric coils.

Also, in lieu of the arrangement of coils in FIGURE 4, a series of geometrically similar conductors may be employed, for example, either straight or curved parallel bars may be electrically connected in suitable sequence to a polyphase current source so as to produce an effective traveling magnetic field passing from bar to bar. By placing a flat crucible with a melt on such parallel bar array, translational stirring will proceed from one side to the other as the electrical current magnetic field passes from bar to bar.

Figure 5:
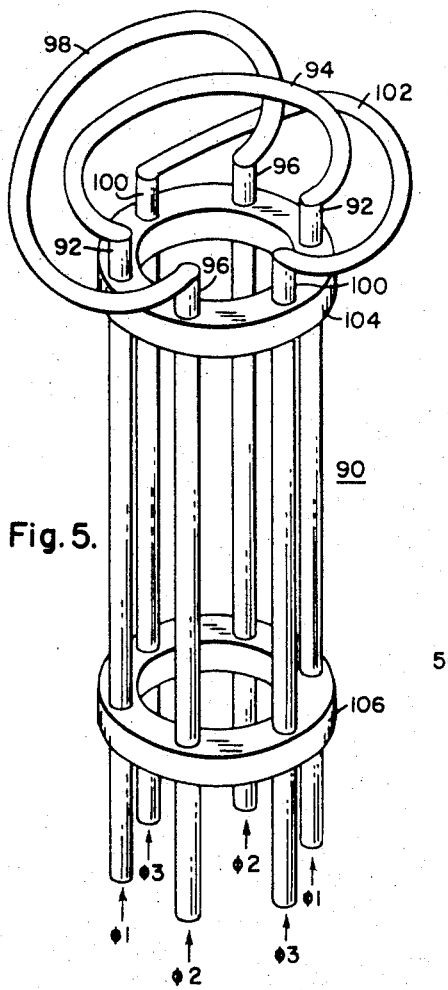
FIGURE 5 is a perspective view of another electromagnetic device designed to rotate the liquid in planes perpendicular to the specimen axis.

Referring to FIGURE 5, a cylindrical electromagnetic device 90 is illustrated. There are no ferromagnetic core materials in this form of apparatus and therefore low power is required to secure good stirring. A moving magnetic field is produced by applying a three-phase alternating current to a cylindrical array of field coils which produce a rotating magnetic field in planes perpendicular to the specimen axis. Three pairs of vertical coils 92—92, 96—96 and 100—100 connected by upper leads 94, 98 and 102 are arranged in a cylindrical arrangement in ring insulators 104 and 106. An elongated cylindrical crucible containing a melt is introduced into the space within the ring insulators and permitted to solidify either radially from the exterior surface or longitudinally. The general coil arrangement of FIG. 5 may be employed with higher polyphase currents whereby more parallel coil bars than the six shown, may be arranged in a cylindrical array. Melts of liquids contained in crucibles of varying cross-sectional configurations may be placed within an array of parallel conductors spaced about the irregular or warped surfaces so as to stir the melt as it progressively solidifies into a homogeneous solid. By this means, rectangular, elliptical and streamlined shaped bars and rods may be produced. The rotating magnetic field effects primary fluid movement of the liquid phase in planes perpendicular to axis of the cylindrical crucible.

Since ferromagnetic core materials are not present, induction heating coils can be disposed within conductors of the device without detrimental coupling. Thus zone refining can be readily carried out in the apparatus of FIG. 5.

The following examples are illustrative of the teachings of the invention:

EXAMPLE I

An elongated cylindrical charge comprising a lead base alloy containing 10% by weight of tin and having a length of 18 inches and about ½ inch in diameter disposed in an open topped graphite boat was placed in a 30 millimeter diameter five foot long length silica tube mounted for longitudinal movement on rollers. The zone refining apparatus was similar to that shown in FIGURE 1. The tube was closed at each end by brass caps. Both caps contained a stainless steel needle valve through which the system was evacuated and the central portion of the tube and the graphite boat was heated to a temperature of 250° C. Then argon was admitted into the tube and the valves were closed. The power for the magnetic stirring to coils 15 and 16 of the apparatus was supplied at 100 volts by a 400 c.p.s. two-phase generator. The alloy charge was zone refined by the action of induction coil 4 and the alternating current magnetic stirring of the magnets. After a single pass was made on the charge, the bar was cut from end to end into a plurality of cylindrical samples and the concentration of tin in each sample was determined. It was determined through calculation that the diffusion boundary layer thickness at the freezing interface was exponentially dependent upon the square of the magnetic field strength for a 400 c.p.s. field rotating in the plane of the interface.

In this way, $v\delta_c/D$ was reduced by a factor of 50 with a field strength of 350 oersteds which, in turn, was produced by a power input of about 300 watts.

However, when the electromagnetic device configuration illustrated in FIGURE 2 was used to melt a similar lead-tin alloy specimen, $v\delta_c/D$ was reduced by a factor of about 200 at the same field strength which was produced by a power input of about 100 watts to the stirring magnets. The lower value of $\delta_c$ arose in the second case because a primary circulation was relied upon rather than secondary circulation. The lower power input was present in the second case because there were no iron losses.

EXAMPLE II

A bar of thermoelectric material consisting of 20% bismuth selenide and 80% bismuth telluride was solidified from a melt using a crystal growth apparatus without any magnetic stirring apparatus. Another bar of the same composition was solidified employing a magnetic stirring system employing the apparatus of FIG. 3. After examining samples taken from each charge, the results showed that the diffusion boundary layer at the freezing interface was reduced in thickness by a factor of 20 with the magnetically stirred charge as compared to the charge processed without stirring.

Figure 6A:
FIGURE 6A is a photomicrograph of a cross-section of material solidified without stirring magnetically; and, FIGURE 6B is a photomicrograph of a cross-section of a similar material processed in accordance with the teachings of the invention.
Figure 6B:
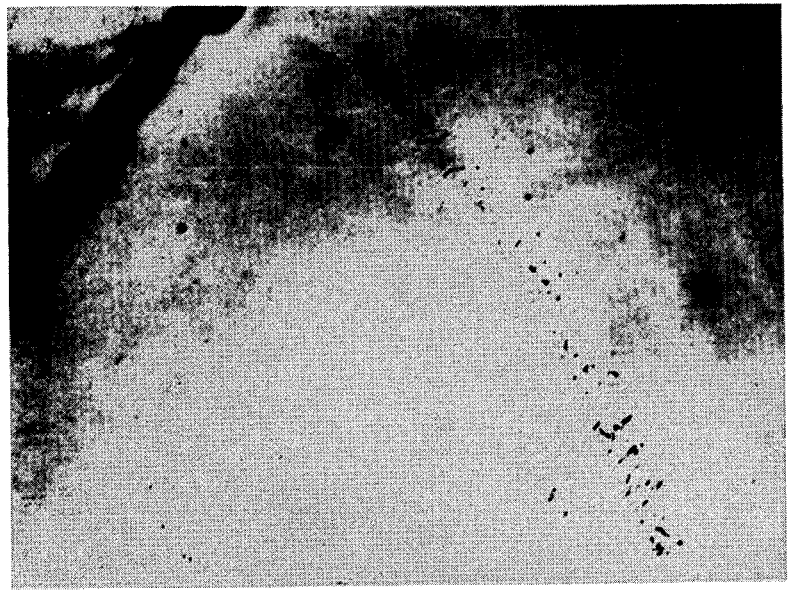

With reference to FIGURES 6A and 6B, there is shown an inhomogeneous and a homogeneous sample respectively, the latter produced in accordance with this Example II. FIG. 6A reveals that severe microsegregation of the chemical constituents on a size scale of about 200 microns has occurred during the freezing process of an unstirred melt, whereas FIG. 6B reveals that, for the magnetically stirred liquid, relatively little microsegregation occurred during the freezing process. The microsegregation in the solid arises because of a particular solid liquid interface morphology that develops under conditions of constitutional supercooling in the liquid adjacent to the interface. As the diffusion boundary layer thickness is reduced, the degree of constitutional supercooling is reduced and the probability of obtaining the type of solid-liquid interface morphology that leads to microsegregation in the solid is reduced.

The consequences of this type of microsegregation in the solid for thermoelectric materials is that the efficiency is reduced, for example, the bar illustrated in FIG. 6A will have definitely poorer thermoelectric properties than that illustrated in FIG. 6B.

EXAMPLE III

An elongated cylindrical charge of mercury was placed in the zone refining apparatus of FIGURE 1. Several steel balls were disposed in the mercury. When the magnetic fields were applied to the mercury the steel balls move violently in the mercury. By freezing the mercury with a refrigerant, and heating only a narrow zone, the arrangement enables stirring of the mercury with great efficiency.

Other materials such as garnet, sulfur, selenium, refractory silicates and other inorganic electrical insulators may also be magnetically stirred by this method of this Example III. Also, saline water in solidified form may be stirred in order to remove the salt by zone purification.

The steel balls in all these instances may be replaced by nickel balls or boron carbide cylinders, or electrically conductive, chemically non-reactive material.

It should be understood that it is possible when employing the devices described herein to (1) increase the multiplicity of phases of currents, (2) increase the multiplicity of poles, (3) increase or decrease the velocity of the traveling waves produced by these devices and (4) modify the shape of the individual poles. For example, the pancake coil illustrated in FIGURE 4 may consist of a parallel array of straight conductors such as shown in FIG. 5, to produce primary fluid flow of a melt in a direction parallel to the surface of the conductors.

Furthermore, the electromagnetic stirring devices are delineated herein as being particularly applicable to relatively small zone refining apparatus. However, the stirring devices may be employed in refining relatively large metal ingots up to inches or even feet in diameter and many feet in length.

It is intended that the above description and drawings be construed as illustrative and not in limitation of the invention.

We claim as our invention:

1. In a controlled solidification apparatus, an elongated receptacle with a melt of material therein, means for cooling one end of the receptacle to cause progressive solidification of the melt from said one end, a plurality of magnetic single turn looped field coils coaxially arranged with respect to each other and the receptacle, the magnetic coils being capable of concentrating a high proportion of the magnetic energy thereof in the melt at the solid-liquid interface thereof, means for moving the receptacle along said axis with respect to the plurality of said magnetic single-turn looped field coils, means for connecting the coils to a source of polyphase alternating current, energizing adjacent coils in a predetermined sequence whereby a translating magnetic field is produced in the melt to electromagnetically stir the molten zone as it freezes at the solid-liquid interface.

2. In apparatus for obtaining controlled segregation and distribution of solutes, heating means for progressively melting a suitably contained bar of material, means for causing the heating means and the bar of material to move with respect to each other, cooling means for solidifying the molten material, a plurality of stacked magnetic single-term looped field coils circumscribing the bar of material, the coils being disposed closely adjacent to each other and being electrically connected in predetermined sequence and being capable of concentrating a high proportion of the magnetic energy thereof at the solid-liquid freezing interface of the molten zone to translate the liquid in planes perpendicular to the interface, and circuit means for connecting the said magnetic single-turn looped field coils to a source of polyphase alternating current in predetermined sequence whereby the magnetic field applied by said coils to the molten zone can continually vary in force and in direction.

3. In a controlled solidification apparatus, a plurality of single turn magnetic looped field coils concentrically disposed with respect to each other and forming a surface, the magnetic coils being connected in predetermined sequence to a source of polyphase alternating current whereby upon passage of the alternating current thereto, the coils will produce a radially translating magnetic field, the said magnetic coils being applied to a receptacle of a molten material wherein the receptacle has a surface substantially parallel to said coil surface, to concentrate a high proportion of the magnetic energy thereof in the liquid melt to translate the liquid radially in planes parallel to the surface of the coils and circuit means for connecting the magnetic coils to a source of alternating current whereby the magnetic field applied by said coils to the molten zone can continually vary in force and in direction.

4. For use in a controlled solidification apparatus, a plurality of geometrically similar substantially parallel single turn loop field conductors, electrically insulating means holding the conductors in substantial parallel arrangement, means electrically connecting the conductors in suitable sequence to a polyphase alternating current source so as to produce an effective traveling magnetic field passing from conductor to conductor in regular sequence, there being substantially no ferro-magnetic material associated with the conductors, the magnetic energy of the parallel conductor arrangement being applied to a liquid melt to translate the melt in direction of travel of the magnetic field in planes parallel to the arrangement of the conductors.

5. In a controlled solidification apparatus, a plurality of geometrically similar single-turn looped field conductors, electrical means attached to and holding the conductors in a substantially parallel cylindrical arrangement, means electrically connecting the conductors in suitable sequence to a polyphase alternating current source so as to produce an effective traveling magnetic field passing from conductor to conductor in regular sequence around the cylindrical arrangement to circumscribe a body of molten material and applying the magnetic energy thereof to the liquid material to move the liquid in direction parallel to movement of the magnetic field.

References Cited

UNITED STATES PATENTS

| | | | |
|---|---|---|---|
| 2,826,666 | 3/1958 | Cater | 23—273 |
| 2,890,940 | 6/1959 | Pfann | 23—301 |
| 3,203,768 | 8/1965 | Tiller et al. | 23—273 |

OTHER REFERENCES

Zone Melting, by William G. Pfann, 1958, John Wiley and Sons, Inc., Chapman and Hall, Limited, pp. 80–92.

NORMAN YUDKOFF, *Primary Examiner.*

G. P. HINES, *Assistant Examiner.*